United States Patent
Lee et al.

(10) Patent No.: US 7,333,927 B2
(45) Date of Patent: Feb. 19, 2008

(54) METHOD FOR RETRIEVING SIMILAR SENTENCE IN TRANSLATION AID SYSTEM

(75) Inventors: Ki-Young Lee, Daejeon (KR); Yoon-Hyung Roh, Daejeon (KR); Chang Hyun Kim, Seoul (KR); Sung Kwon Choi, Daejeon (KR); Young Kil Kim, Daejeon (KR); Young-Ae Seo, Daejeon (KR); Seung Il Yang, Daejeon (KR); Cheol Ryu, Daejeon (KR); Mun-Pyo Hong, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 851 days.

(21) Appl. No.: 10/202,649

(22) Filed: Jul. 25, 2002

(65) Prior Publication Data

US 2003/0125928 A1    Jul. 3, 2003

(30) Foreign Application Priority Data

Dec. 28, 2001    (KR) .............................. 2001-86929

(51) Int. Cl.
*G06F 17/28*    (2006.01)

(52) U.S. Cl. .............................. 704/4; 704/2; 704/277; 704/5

(58) Field of Classification Search .................... 704/2, 704/4–5, 7, 9–10, 1, 6, 8, 277, 270

See application file for complete search history.

(56) References Cited

U.S. PATENT DOCUMENTS

| | | | | |
|---|---|---|---|---|
| 5,477,451 A | * | 12/1995 | Brown et al. ................... | 704/9 |
| 5,826,219 A | * | 10/1998 | Kutsumi ......................... | 704/4 |
| 6,131,082 A | * | 10/2000 | Hargrave et al. .............. | 704/7 |
| 6,304,841 B1 | * | 10/2001 | Berger et al. .................. | 704/2 |

FOREIGN PATENT DOCUMENTS

| | | |
|---|---|---|
| KR | 2000-36487 | 7/2000 |
| KR | 2000-56245 | 9/2000 |
| KR | 2001-81770 | 8/2001 |

* cited by examiner

*Primary Examiner*—Huyen X. Vo
(74) *Attorney, Agent, or Firm*—Lowe Hauptman Ham & Berner LLP

(57) ABSTRACT

The method for retrieving a similar sentence to a source sentence inputted by a user through a translation memory in a translation aid system is provided. An inverted file of an index word and a translation memory from a parallel corpus are constituted. Candidate sentences having a high similarity are filtered by comparing the source sentence provided by the user with sentences of the constituted translation memory. A source sentence and a corresponding target sentence are outputted in the order of similarity by calculating similarity between the filtered candidate sentences and the source sentence.

5 Claims, 3 Drawing Sheets

FIG.2

INDEX INVERTED FILE CONTENTS — 201

| 결과/NOUN | (1:2) | 운영체제/NOUN | (2:4) |
|---|---|---|---|
| 출력하/NOUN | (1:4) | 설치/NOUN | (2:7) |
| 프린터/NOUN | (1:6)(2:6) | 지원하/VERB | (2:9) |
| 메뉴/NOUN | (1:7) | 등록/NOUN | (3:2) |
| 실행하/VERB | (1:9)(3:8) | 되/VERB | (3:4) |
| SUN/NOUN | (2:2) | CLI/NOUN | (3:6) |
| OS/NOUN | (2:3) | ..... | |

INPUT SOURCE SENTENCE : 시험 인쇄를 확인하려면 프린터 메뉴를 실행합니다. — 202

INDEX WORDS EXTRACTED FROM INPUT SOURCE SENTENCE :
시험/NOUN 인쇄/NOUN 확인하/VERB 프린터/NOUN
메뉴/NOUN 실행하/VERB — 203

COMBINED CANDIDATE SENTENCES INCLUDING INDEX WORD
CANDIDATE SENTENCE 1 : 프린터/NOUN 메뉴/NOUN 실행하/VERB
CANDIDATE SENTENCE 2 : 프린터/NOUN
CANDIDATE SENTENCE 3 : 실행하/VERB — 204

CALCULATION OF MATCHING WEIGHT VALUE WHEN A VERB AND AN ADJECTIVE WEIGHT VALUE =10 AND A NOUN WEIGHT VALUE = 7
CANDIDATE SENTENCE 1 : 2(THE NUMBER OF MATCHED NOUNS) * 7+ 1
　　　　　　　　　　(THE NUMBER OF MATCHED VERBS) * 10 =24
CANDIDATE SENTENCE 2 : 1(THE NUMBER OF MATCHED NOUNS) * 7=7
CANDIDATE SENTENCE 3 : 1(THE NUMBER OF MATCHED VERBS) * 10 =10 — 205

FIG.3

301 SOURCE SENTENCE : 그/NOUN + 는/POSTPOSITION + 교회/NOUN + 에/POSTPOSITION + 가/VERB + ㄴ다/ POSTPOSITION

302 CONDIDATE SENTENCE 1 : 부지런하/ADJECTIVE + ㄴ/POSTPOSITION 나/NOUN + 는/POSTPOSITION + 일찍/ADVERB + 학교/NOUN + 에/POSTPOSITION + 가/VERB + ㄴ 다/POSTPOSITION

303 MATCHING WEIGHT VALUE OF A PART OF SPEECH
VERB OR ADJECTIVE : 10
POSTPOSITION :8
NOUN : 5
ETC : 3

304 WEIGHT VALUES OF EDIT OPERATIONS
' MATCHING ' : -10
' INSERTION ' : 2
' DELETION ' : 1

SIMILARITY BETWEEN INPUT SOURCE SENTENCE AND CANDIDATE SENTENCE 1

305 (8* -10) (는/POSTPOSITION) + (8* -10 )(에/POSTPOSITION ) + (10*-10)(가/VERB) + (8*-10)(ㄴ다/POSTPOSITION)+ 5('DELETION' OPERATION PERFORMING FREQUENCY) * 1(WEIGHT VALUE OF 'DELETION' OPERATION) + 3('INSERTION' OPERATION PERFORMING FREQUENCY ) *2(WEIGHT VALUE OF ' INSERTION' OPERATION)=-329

METHOD FOR RETRIEVING SIMILAR SENTENCE IN TRANSLATION AID SYSTEM

FIELD OF THE INVENTION

The present invention relates to a method for retrieving similar sentence in a translation aid system; and, more particularly, to a method for retrieving a similar sentence in a translation aid system.

BACKGROUND OF THE INVENTION

In case of a general machine translation system, natural translation quality cannot be obtained currently. This is because a source language analysis technology is not perfect yet and a transfer technology for transferring the source language into a target language is also unsatisfactory.

In opposition to this, a translation aid system that is more practical than a current machine translation system helps a translation of users by retrieving the most similar sentence to a sentence that a user wants to translate and a corresponding target sentence from a translation memory although a perfect automatic translation function is not provided.

However, since most translation aid systems simply use only a string matching method for words shown in an input source sentence, there is still a disadvantage that only a superficially matched sentence can be outputted.

Therefore, in order to solve the problem above and actualize a result of better quality by considering structural and grammatical elements of a sentence, a technical scheme for extracting a similar sentence by applying not only a simple matching of superficially matched words but also different weight values according to a result of a morpheme analysis and a part of speech is desired.

SUMMARY OF THE INVENTION

It is, therefore, an object of the present invention to provide a similar sentence retrieval method for a translation aid system that helps an implementation of more precise system efficiency by outputting a source sentence and a corresponding translated sentence.

In accordance with the present invention, there is provided a method for retrieving a similar sentence to a source sentence inputted by a user through a translation memory in a translation aid system, including the steps of: (a) constituting an inverted file of an index word and a translation memory from a parallel corpus; (b) filtering candidate sentences having high similarity by comparing the input source sentence provided by the user with sentences of the constituted translation memory; and (c) outputting a source sentence and a target sentence in the order of similarity by calculating similarity between the filtered candidate sentences and the source sentence.

BRIEF DESCRIPTION OF THE DRAWINGS

The above and other objects and features of the present invention will become apparent from the following description of preferred embodiments, given in conjunction with the accompanying drawings, in which:

FIG. 2 shows a filtering process as a similar sentence retrieval scheme in accordance with a first preferred embodiment of the present invention; and FIG. 3 describes a similarity calculation process as a similar sentence retrieval scheme in accordance with a second preferred embodiment of the present invention.

DETAILED DESCRIPTION OF THE PREFERRED EMBODIMENTS

Figure 1:
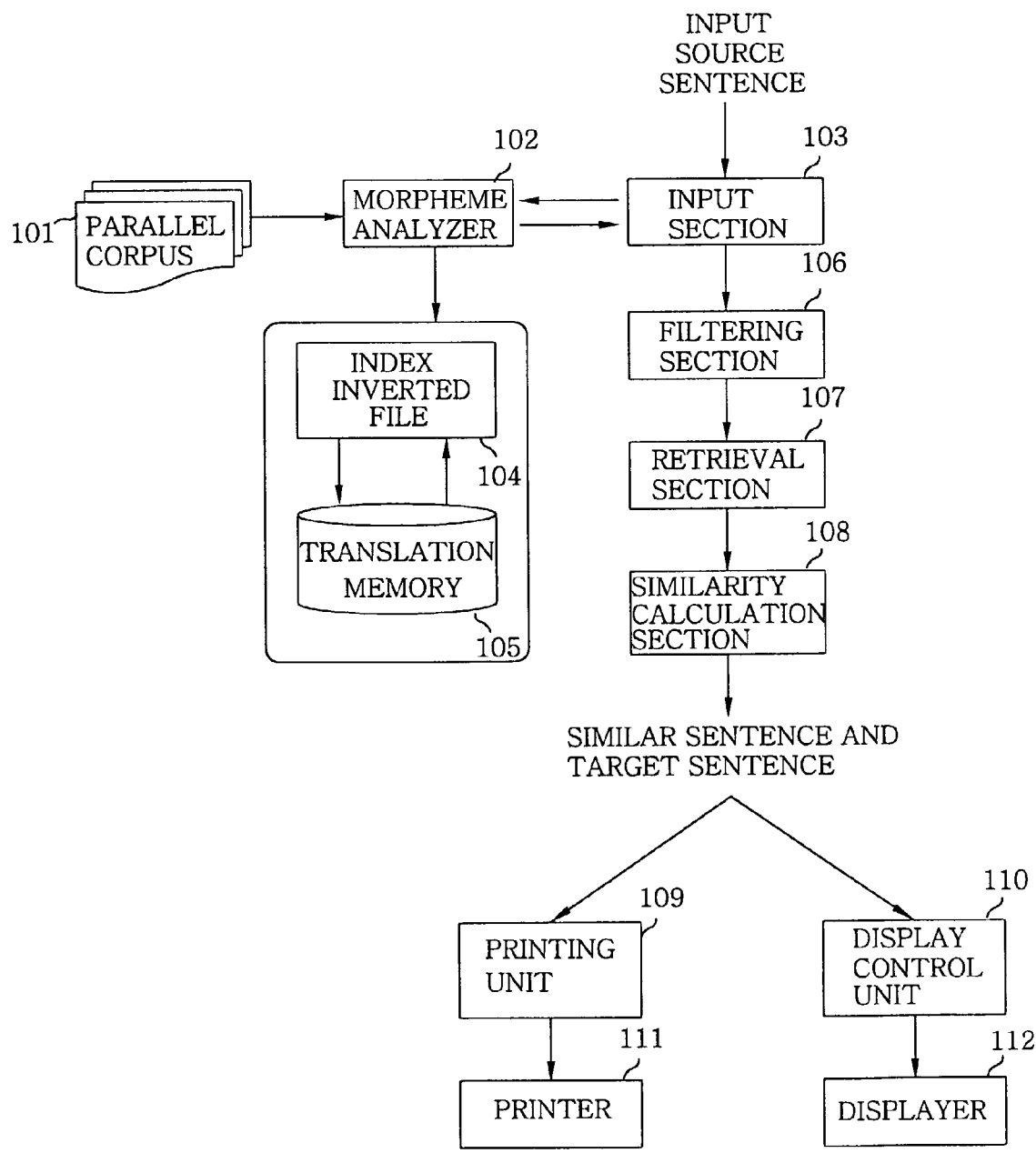
FIG. 1 is a configuration block diagram of a translation aid system employing a similar sentence retrieval scheme in accordance with the present invention.

Before an explanation, definitions of terms being used in the present invention are as follows.

First of all, a translation memory is constituted with a source sentence, a morpheme analysis result of the source sentence and a bilingual sentence. The bigger the translation memory is, the higher a probability to find a similar sentence to an input sentence is.

An index inverted file extracts an index word from a morpheme analysis result of all sentences constituting the translation memory and has the index word as a key. Also, it has a sentence number that the word is shown and location information in a sentence.

A similarity between sentences, which is calculated according to a defined similarity, shows a measure of a degree of grammatical and semantic similarity between two sentences.

In preferred embodiments hereinafter, a translation aid system using the translation memory will be described as an example. However, the preferred embodiments are not limited to the translation aid system using the translation memory.

FIG. 1 is a configuration block diagram of a translation aid system employing a similar sentence retrieval scheme in accordance with the present invention.

A translation memory 105 analyzes morphemes of an unprocessed parallel corpus 101 through a morpheme analyzer 102. Then, it is constituted with a set of three components of a source sentence, a morpheme analysis result of the source sentence and a corresponding target sentence. In this process, a separate index inverted file 104 is made by extracting index words from each source sentence constituting the translation memory 105. The index inverted file 104 includes information about a sentence number and morpheme location information, i.e., which morpheme of which sentence corresponds to a noun, a verb and an adjective being used as an index word among morpheme analysis results of all source sentences constituting the translation memory 105.

Further, morphemes of each word constituting the source sentence that is inputted through an input section 103 are analyzed by the morpheme analyzer 102. At the same time, each part of speech of those words is determined.

Moreover, a filtering section 106 performs a separate extraction of morphemes corresponding to a noun, a verb and an adjective that are used as an index word from an input source sentence. By referring to information of the index inverted file 104, candidate sentences having index words of the input source sentence are virtually constituted. The constituted virtual candidate sentences are composed of only index words, not sentences loaded in the translation memory 105. These sentences are firstly filtered by applying a weight value of a noun, a verb and an adjective and calculating a matching ratio between the input source sentence and the virtually constituted candidate sentences.

The filtering is needed to decrease overhead of similarity calculation by extracting certain candidate sentences before calculating similarity between all source sentences constituting the translation memory 105 and the input source sentence.

Also, a retrieval section 107 performs a function to load the retrieved result after retrieving candidate sentences provided by the filtering section 106 described above through the translation memory 105.

In a similarity calculation section 108, similarity is calculated for each candidate sentence of the translation memory 105 by using an "Edit Distance" scheme that a weight value for each part of speech is applied.

Finally, according to the similarity calculated in the similarity calculation section 108, an order of ranks of similar sentences of the translation memory 105 is set, and the similar sentences are outputted in the order of ranks by a printer 111 or a displayer 112 through a printing unit 109 or a display control unit 110.

Hereinafter, a similar sentence retrieval implementation process in accordance with the preferred embodiments of the present invention will be described in detail with reference to FIGS. 2 and 3.

FIG. 2 describes a filtering process as a similar sentence retrieval scheme in accordance with a first preferred embodiment of the present invention.

As illustrated in FIG. 2, an index inverted file content 210 analyzes morphemes of each source sentence constituting the translation memory 105 and extracts only a noun, a verb and an adjective being used as an index word as described above. Then, it has a sentence number of the corresponding word and location information in the corresponding sentence.

As a first step of the filtering section 106, when an input source sentence 202 is inputted, a part of speech of each word of the input source sentence is determined by a morpheme analysis process of the morpheme analyzer 102. Here, only words corresponding to a noun, a verb and an adjective being used as an index among each word of the input source sentence are extracted. These are index words 203 extracted from the input source sentence 202 of FIG. 2.

Next, recombined candidate sentences 204 including the index word are generated by using sentence number information and morpheme location information about the index word of the extracted input source sentence 202 of an index inverted file 104.

A matching weight value between the input source sentence and the candidate sentence is obtained by applying a matching weight value of a noun, a verb and an adjective to those combined candidate sentences 204. The matching weight value is illustrated in 205 of FIG. 2.

Here, the matching weight value can be described as a following Equation 1.

matching weight value=(a number of matched nouns*a weight value of a noun)+(a number of matched verbs or adjectives*a weight value of a word with inflected or conjugated endings)  [Equation 1]

By using the calculated matching weight value, sentences of a translation memory, which have a high possibility to become candidates, can be extracted.

The filtering process described above can help a calculation of similarity between sentences among all sentences of the translation memory 105, which will be described hereinafter.

FIG. 3 describes a similarity calculation process as a similar sentence retrieval scheme in accordance with a second preferred embodiment of the present invention.

In this process, by using the result of the filtering section 106 described above, an actual candidate sentence is loaded from the translation memory 105, and similarity between each candidate sentence and an input source sentence is calculated.

Before a description of FIG. 3, "Edit Distance" that is applied to the preferred embodiment indicates differences between two sentences quantitatively. In other words, "Edit Distance" means a sum of the number of words that are deleted and inserted based on a sentence A, when a sentence A is changed into a sentence B. However, when "Edit Distance" is used as it is in a translation aid system, a result may be considerably different from what a user wants, since "Edit Distance" only considers whether a superficial expression is matched or not with two sentences. Therefore, in the present invention, "Edit Distance" considering following points is applied.

First, different matching weight values are applied according to a part of speech of matched words by considering not only a superficially matched word but also a part of speech of words. The reason for this is to consider a structural similarity of sentences. That is, a structurally similar candidate sentence can be outputted as a result although the structurally similar candidate sentence is not superficially matched with words of the candidate sentence of a translation memory. For example, when a matching weight value of a verb, a postposition indicating cases and the end of a word is larger than that of a noun, there is a high possibility that a structurally similar sentence to an input source sentence is obtained as a result.

Second, a matching operation, an insertion operation and a deletion operation are used as a basic operation of "Edit Distance". This is because the insertion operation and the deletion operation perform normalization when a candidate sentence is too long or too short. That is to say, although the number of matched words in a sentence A of a long candidate sentence and a sentence B of a short candidate sentence is same, the candidate sentence B can be judged to be more similar than the candidate sentence A by the insertion operation and the deletion operation.

In short, in the preferred embodiment, an "Edit Distance" method that a weight value is applied is used.

A following table 1 shows types of Edit operation and a weight value corresponding to each Edit operation, which are used in the present invention.

TABLE 1

| Types of Edit operation | Weight value |
| --- | --- |
| Matching | −10 |
| Insertion | 2 |
| Deletion | 1 |

A following table 2 represents weight values according to a part of speech of matching words that are used in the present invention.

TABLE 2

| A part of speech | Weight value |
| --- | --- |
| Verb | 10 |
| Postposition | 8 |
| Noun Head | 5 |
| Etc. | 3 |

Weight values of operations and matching weight values of a part of speech illustrated in the table 1 and the table 2 are determined heuristically.

The points described above are about "Edit Distance" that weight values considering a part of speech are applied. The followings are elements to consider when calculating similarity between sentences.

First, a word distribution shown in an input source sentence is considered. The reason for this is as follows. For example, when the input source sentence includes a compound noun, there is a candidate sentence having the corresponding compound noun as a same form and a candidate sentence including the corresponding compound noun as a disassembled form. Then the number of matched words is same in both candidate sentences. However, when considering a word distribution of the input source sentence, the candidate sentence having the corresponding compound noun as a same form can be judged to be more similar.

The similarity between sentences being used in the present invention can be indicated as a following Equation 2.

$$\text{similarity between sentences} = \quad \text{[Equation 2]}$$
$$\text{(to each word being matched)}$$
$$\text{(weight value of a part of speech based on matched}$$
$$\text{words} * \text{'matching' operation)} + \text{(weight value of}$$
$$\text{'insertion' operation} * \text{'insertion' operation performing}$$
$$\text{frequency)} + \text{(weight value of 'deletion' operation} *$$
$$\text{'deletion' operation performing frequency)}$$

In a viewpoint of 'cost', the lower a result of similarity between sentences, which is obtained by applying the Equation 2, is, the higher the similarity is.

As illustrated in FIG. 3, when a morpheme analysis result 301 of an input source sentence 202 and a morpheme analysis result 302 of a candidate sentence 1 in a translation memory 105 are given, a result of '−329' is obtained by applying the Equation 2 above and calculating similarity between the input source sentence 201 and the candidate sentence 1 302.

On the other hand, the parts being indicated thick with underlines depict matching parts with words of the input source sentence.

Even though the present invention has been described with reference to the preferred embodiments, it is not limited in these preferred embodiments. Furthermore, it will be apparent to those skilled in the art that it can be stored in recording medium such as CD ROM, RAM, ROM, floppy disk, hard disk and optic magnetic disk that are readable by computers through an implementation into various modifications, e.g., a program.

While the invention has been shown and described with respect to the preferred embodiments, it will be understood by those skilled in the art that various changes and modifications may be made without departing from the spirit and scope of the invention as defined in the following claims.

What is claimed is:

1. A method for aiding language translation of an input sentence, comprising:
   (a) searching receiving the input sentence a translation memory of source sentences for at least one sentence having a high similarity to the input sentence, wherein the source sentences comprising the translation memory are in a same language as the input sentence, the search comprising:
      (a1) performing a morpheme analysis of the input sentence, extracting only words corresponding to a noun, verb and adjective;
      (a2) creating at least one candidate sentence in the same language, each candidate sentence reconstructed from an index inverted file using the words extracted from the input sentence as an index into the index inverted file;
      (a3) calculating a matching weight for each candidate sentence by applying a matching weight value associated with a noun, a verb, and an adjective to each noun, verb, and adjective in the candidate sentence that matches a corresponding extracted word from the analyzed input sentence;
      (a4) filtering candidate sentences according to the matching weight value of each candidate sentence; and
      (a5) calculating a similarity value between the at least one filtered candidate sentence and the input sentence according to a predefined similarity, the similarity value indicating a measure of a degree of grammatical and semantic similarity between the two same language sentences; and
   (b) outputting a target sentence from the translation memory, the target sentence being a translation of the source sentence associated with the at least one selected filtered candidate sentence.

2. The method of claim 1, wherein step (a5) includes calculating a similarity value for each candidate sentence by using an "Edit Distance" method wherein a weight value is applied for each part of speech of the group consisting of noun, verb, and adjective.

3. The method of claim 1, wherein step (a5) further comprises:
   setting an order of ranks of source sentences of the translation memory similar to the input sentence based upon the similarity value for each associated filtered candidate sentence; and
   outputting the similar source sentences in the order of ranks.

4. The method of claim 1, further comprising, and prior to step (a):
   constructing the translation memory, the translation memory comprising at least one source sentence in the same language as the input sentence, and a target sentence in another language; and
   constructing the index inverted file, wherein constructing the index inverted file comprises:
      performing a morpheme analysis of each source sentence in the translation memory;
      extracting each word from the source sentence that is a noun, verb, or adjective; and
      creating a record for each word, wherein each record is indexed by the extracted word, and comprises:
         a sentence number of the source sentence in the translation memory;
         a position of each word in the source sentence; and
         one of a noun, verb, and adjective part of speech associated with the word.

5. The method of claim 1, wherein step (a3) comprises:
   assigning a first predetermined weight value to each noun;
   assigning a second predetermined weight value to each verb;
   assigning a third predetermined weight value to each adjectives; and
   calculating the matching weight value for each candidate sentence by multiplying a number of matching nouns, verbs, and adjectives by their respective weight values.

* * * * *